May 21, 1935.　　　　　L. E. LA BRIE　　　　　2,002,017

BRAKE

Filed March 21, 1931

INVENTOR.
LUDGER E. LA BRIE
BY
ATTORNEY

Patented May 21, 1935

2,002,017

UNITED STATES PATENT OFFICE 2,002,017

BRAKE

Ludger E. La Brie, South Bend, Ind., assignor to Bendix Brake Company, South Bend, Ind., a corporation of Illinois Application March 21, 1931, Serial No. 524,253

13 Claims. (Cl. 188—78)

This invention relates to brakes, and is illustrated as embodied in an internal expanding automobile brake of the shiftable anchorage type. An object of the invention is to provide on the brake shoe, or its equivalent, novel shiftable means such as a link pivoted thereon and preferably held by means such as a novel friction clamp, and which in the illustrated brake engages the brake anchor, thus compensating automatically for inaccuracies in the setting of the anchor, for eccentricity of the drum, etc.

Figure 1:
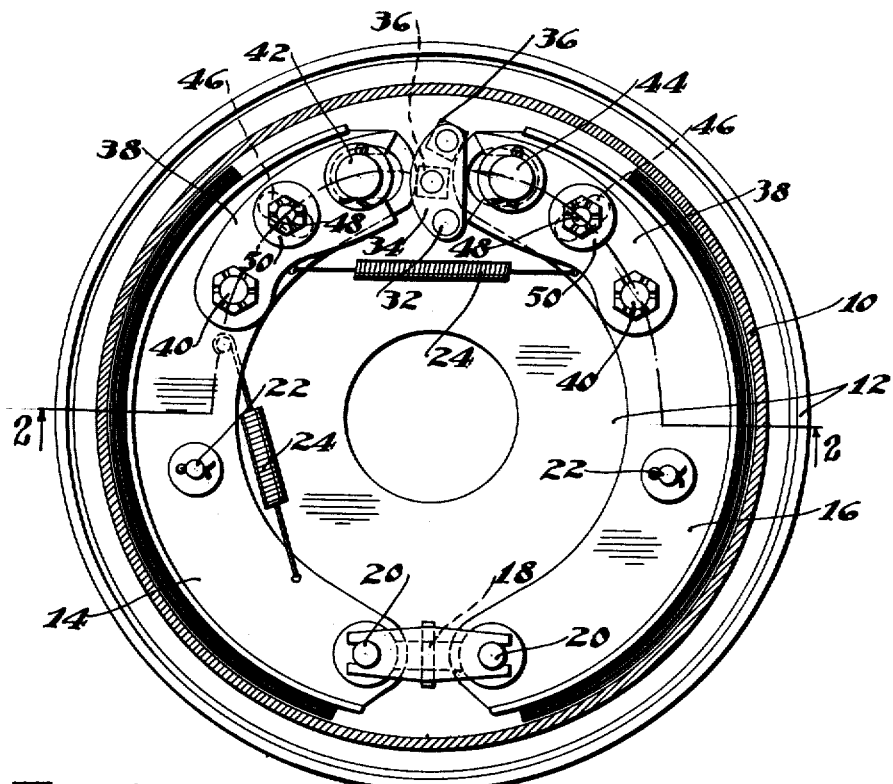
Figure 2:
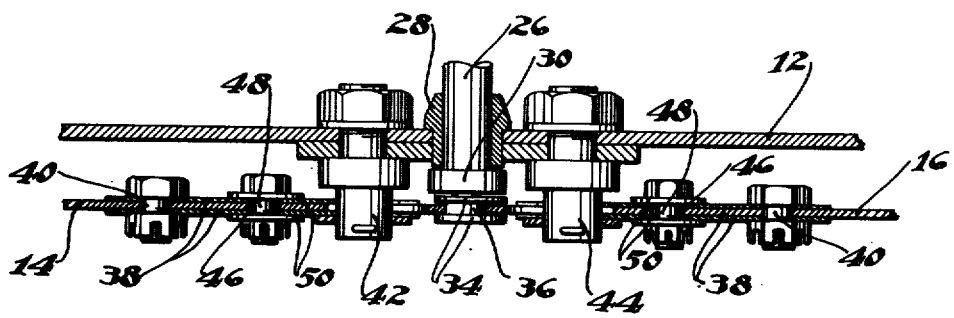

The above and other objects and features of the invention, including various novel combinations of parts and desirable particular constructions will be apparent from the following description of the illustrative embodiment shown in the accompanying drawing, in which:

Figure 1 is a section through the brake, just inside the head of the brake drum, and showing the brake shoes in side elevation; and Figure 2 is a section on the line 2—2 of Figure 1, showing the mounting of the links and their engagement with the brake anchors.

The illustrated brake includes a rotatable drum 10, at the open side of which is a support such as a backing plate 12, and within which is arranged the brake friction means shown as a pair of shoes 14 and 16 connected by a right-and-left threaded articulating member 18 threaded into pivots 20 in the ends of the shoes. Suitable steady rests 22 and return springs 24 are provided.

The brake is applied by means such as a shaft 26, journaled in a bearing 28 carried by the backing plate, and having at its end a crank arm 30 with a pivot 32 at its lower end on which is pivoted a floating cam lever 34 carrying pivoted thrust blocks 36 engaging the shoe ends.

According to the present invention one or both of the shoes or their equivalents have at their upper ends links, or pairs of links, 38 mounted at their lower ends (i. e. at the ends opposite the brake anchors) on pivots 40 carried by the webs of the shoes. The links 38 are formed at their upper ends with flared notches or openings engaging anchor posts 42 and 44 carried by the backing plate.

Between the pivot 40 and the anchor 42 or 44, either the shoe web or the link is formed with an enlarged opening 46, through which passes a fastening such as a clamp bolt 48 having friction washers 50. The fastening 48 frictionally holds the links 38 in any angular position to which they are shifted by the pressures thereon.

In operation, if the drum is turning clockwise when the brake is applied the shoe 14 will anchor through its links 38 on the post 42, while if the drum is turning counter-clockwise the shoe 16 will anchor through its links 38 on the post 44.

While one illustrative embodiment has been described in detail, it is not my intention to limit the scope of the invention to that particular embodiment or otherwise than by the terms of the appended claims. From one point of view, the present invention may be regarded as a modification of the structure described and claimed in application No. 453,386, filed May 17, 1930.

I claim:

1. A brake comprising a rotatable drum and friction means anchoring at one end when the drum is turning in one direction and at the other end when the drum is turning in the other direction, and having at its opposite ends frictionally-pivoted anchor links.

2. A brake of the shiftable-anchorage type comprising a rotatable drum and friction means anchoring at one end when the drum is turning in one direction and at the other end when the drum is turning in the other direction, and having at least one end a frictionally-pivoted anchor link.

3. A pair of brake shoes each having an anchor link pivoted near one end, and provided with means passing through the shoe and said link and holding the link in different angular positions, in combination with a floating adjustable joint connecting the ends of said shoes opposite the links.

4. A brake comprising a brake shoe having a web, an enlarged aperture in said web an anchor loosely encompassed by said aperture, a link pivoted to said web and having a notch adapted to engage said anchor.

5. A brake comprising a brake shoe having a web, an anchor, a large opening at one end of said shoe through said web loosely encompassing said anchor, and a short link pivoted to said web adjacent the end thereof, said link being adapted to engage said anchor.

6. A brake comprising a brake shoe having a web, an anchor therefor located at one end of said shoe, a cut away portion of said web through which said anchor passes, and a short link pivoted to said web and engaging said anchor.

7. A brake comprising a brake shoe having a web, an anchor for said shoe located at one end thereof, a cut away portion of said web through which said anchor passes, a short link pivoted to said web and engaging said anchor, and an actuating cam engaging the end of said web.

8. A brake comprising a drum, anchorage means, applying means adjacent the anchorage means, and friction means having at its ends substantially rigid webs engaged by the applying means and having frictionally clamped to said webs thrust links one of which anchors on the anchorage means when the drum is turning in one direction and the other of which anchors thereon when the drum is turning in the other direction and which can yield under considerable anchoring pressure to permit the friction means to adjust its position automatically to the drum but which are held against shifting when not under such pressure.

9. A brake comprising a drum, anchorage means, applying means adjacent the anchorage means, and friction means having at its ends substantially rigid webs engaged by the applying means and having arranged alongside said webs and pivoted thereto thrust links provided with means yieldingly gripping said webs and resisting relative movement of the webs and links and one of which anchors on the anchorage means when the drum is turning in one direction and the other of which anchors thereon when the drum is turning in the other direction and which can yield under considerable anchoring pressure to permit the friction means to adjust its position automatically to the drum but which are held against shifting when not under such pressure.

10. A brake comprising a drum, a pair of anchors, applying means between said anchors, friction means having webs formed with openings encircling and spaced from the anchors and which webs are engaged at their ends by said applying means, thrust links pivoted to said webs and having anchoring engagement respectively with said anchors, and means frictionally gripping the webs and said links together and yieldingly resisting relative movement thereof.

11. A brake comprising a drum, a pair of anchors, applying means between said anchors, friction means having webs formed with openings encircling and spaced from the anchors and which webs are engaged at their ends by said applying means, and thrust links pivoted to said webs and having anchoring engagement respectively with said anchors.

12. A brake comprising a drum, anchorage means, applying means adjacent the anchorage means, a pair of floating shoes engaged at their ends on one side of the drum by said applying means and having at the other side of the drum a floating adjustable articulation, members movably mounted on the shoes respectively and one of which anchors on the anchorage means when the drum is turning in one direction and the other of which anchors on the anchorage means when the drum is turning in the other direction, and means for frictionally gripping each of said members to its shoe and yieldingly resisting movement thereof relatively to its shoe.

13. A brake comprising a drum, a pair of anchors, applying means between the anchors, a pair of floating shoes engaged at their ends on one side of the drum by said applying means and having at the other side of the drum a floating adjustable articulation, members movably mounted on the shoes respectively and one of which anchors on the corresponding anchor when the drum is turning in one direction and the other of which anchors on the other anchor when the drum is turning in the other direction, and means for frictionally gripping each of said members to its shoe and yieldingly resisting movement thereof relatively to its shoe.

LUDGER E. LA BRIE.